United States Patent [19]

Haas

[11] 4,209,609
[45] Jun. 24, 1980

[54] TOLUENE DIAMINE INITIATED POLYETHER POLYOLS

[75] Inventor: James L. Haas, Pittsburgh, Pa.

[73] Assignee: Mobay Chemical Corporation, Pittsburgh, Pa.

[21] Appl. No.: 946,259

[22] Filed: Sep. 27, 1978

Related U.S. Application Data

[63] Continuation of Ser. No. 849,196, Nov. 7, 1977, abandoned.

[51] Int. Cl.$^2$ ............................................. C08L 71/02
[52] U.S. Cl. .................................... 528/421; 260/573
[58] Field of Search .......................... 528/421; 260/573

[56] References Cited

U.S. PATENT DOCUMENTS

| | | | |
|---|---|---|---|
| 3,403,131 | 9/1968 | Garnish ................................. | 260/573 |
| 3,423,344 | 1/1969 | Odinak et al. ........................ | 521/174 |
| 3,462,492 | 8/1969 | Kober ................................... | 260/573 |
| 3,499,009 | 3/1970 | Odinak et al. ........................ | 521/174 |

FOREIGN PATENT DOCUMENTS 972772  10/1964  United Kingdom .

*Primary Examiner*—Maurice J. Welsh
*Attorney, Agent, or Firm*—Gene Harsh; Joseph C. Gil; R. Brent Olson

[57] ABSTRACT

The instant invention is directed to novel polyols and the use thereof in producing polyurethane foams. The polyols comprise the adduct obtained by first reacting toluene diamine with from three to five moles of ethylene oxide and thereafter with from 1 to 5.1 moles (per mole of toluene diamine) of a vicinal alkylene oxide of from 3 to 9 carbon atoms, with the proviso that the total number of moles of ethylene oxide plus vicinal alkylene oxide does not exceed 8.1 and is no less than 5. When polyurethane foams are produced using the novel polyols herein, foams of low friability and good dimensional stability result.

10 Claims, No Drawings

TOLUENE DIAMINE INITIATED POLYETHER POLYOLS

This is a continuation of application Ser. No. 849,196 filed Nov. 7, 1977 and now abandoned.

BACKGROUND OF THE INVENTION

Polyether polyols which are formed by alkoxylating various amines are known. Thus, in U.S. Pat. Nos. 3,423,344 and 3,499,009, polyols are described which are produced by reacting methylene-bis(phenylamine) with various alkylene oxides. Although these polyols, when used to produce rigid polyurethane foams, have met with some success, the resultant foams still suffer from problems relative to dimensional stability and surface friability.

Alkoxylated toluene diamines are also broadly known. Thus, in British Pat. No. 972,772, a product is broadly described which is the alkoxylated product of tetra-β-hydroxyl ethyl-2,4-diamino toluene. However, this reference gives no guidelines as to ratios of the various alkylene oxides to be used in producing foams of good dimensional stability and good surface friability.

DESCRIPTION OF THE INVENTION

It has now been found that the novel polyols disclosed herein, when used to produce polyurethane foams, yield foams having excellent dimensional stability and good surface friability.

The polyols of the instant invention comprise:

(a) from 10 to 100 percent by weight of an adduct obtained by reacting toluene diamine sequentially first with from three to five moles, and preferably four moles, of ethylene oxide and second with from one to five moles, and preferably one to 4.1 moles of a vicinal alkylene oxide of from 3 to 9 carbon atoms with the proviso that the total number of moles of ethylene oxide plus vicinal alkylene oxide does not exceed 8.1 and is no less than 5; and (b) from 0 to 90 percent by weight of a material containing from 2 to 8 hydroxyl groups and preferably containing alkylene oxide residues, the amount of ethylene oxide residues in the polyol blend being less than 80 percent based on the total number of alkylene oxide segments present in said blend.

The adduct of the instant invention may also be characterized by the following general formula:

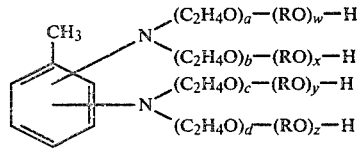

where

R represents an alkylene group of from 3 to 9 carbon atoms, a, b, c, d, w, x, y and z represent numbers from 0 to 2, a+b+c+d is from 3 to 5, w+x+y+z is from 1 to 5.1, and wherein the relationship of a, b, c, d, w, x, y and z to each other satisfies the following:

$$5 = a+b+c+d+w+x+y+z \leq 8.1.$$

Whenever used herein, and as used in the claims, the term "toluene diamine" is intended to mean 2,4-toluene diamine, 2,6-toluene diamine and mixtures thereof.

In preparing the adduct of the instant invention, toluene diamine is reacted firstly with ethylene oxide and the reaction product so obtained is reacted with a vicinal alkylene oxide having at least 3 carbon atoms. The term vicinal alkylene oxide having at least 3 carbon atoms means an alkylene oxide having the formula

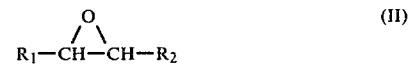

wherein $R_1$ represents an alkyl group of from 1 to 9 carbon atoms and $R_2$ is selected from the class consisting of hydrogen and an alkyl group of from 1 to 6 carbon atoms. Examples of vicinal alkylene oxides having at least 3 carbon atoms include 1,2-propylene oxide, 1,2-butylene oxide, 1,2-heptylene oxide, 3,4-octylene oxide, 2,3-nonylene oxide, and the like.

In carrying out the first alkoxylation step, one mole of toluene diamine is reacted with from three to five moles of ethylene oxide (preferably four moles). The reaction between ethylene oxide and the toluene diamine is carried out at a temperature in the range of from about 100° C. to about 220° C., preferably from 105° to 110° C. at atmospheric pressure, i.e., in an autoclave or similar closed vessel. Of course, lower temperatures could be used, but the reaction time will be necessarily extended. At atmospheric pressure, it is usually preferred to maintain the reaction mixture at the desired temperature and to pass the ethylene oxide below the surface of the reaction mixture at about the rate at which the oxide is consumed. At superatmospheric pressure the alkylene oxide is advantageously added, either continuously or intermittently, at such a rate that the reaction temperature and pressure can be maintained at the desired levels.

It has been found the reaction of the ethylene oxide and the toluene diamine proceeds readily without a catalyst until the amount of ethylene oxide consumed corresponds to 4 moles per mole of amine. At this point, each of the free hydrogens on the amino moieties of the amine has been replaced by a 2-hydroxyethyl group. Theoretically when the stage has been reached at which one of the two hydrogen atoms on a primary amino group of the amine has been replaced by 2-hydroxyethyl, the second equivalent of ethylene oxide can attack either the remaining N—H bond on the amino group or the O—H linkage of the 2-hydroxyethyl group. The reactivity of the N—H linkage is however significantly higher than that of the O—H linkage so that the second equivalent of ethylene oxide attacks the N—H linkage preferentially.

If desired, an alkoxylation catalyst can be used. Any alkoxylation catalyst known in the art can be employed for this purpose. Examples of such catalysts are tertiary amines such as pyridine, triethylamine and the like, alkali metals such as sodium, potassium, and lithium and alkali metal hydroxides such as sodium hydroxide, potassium hydroxide, lithium hydroxide, and the like.

The amount of alkoxylation catalyst employed in the above process is generally within the range of about 0.0001 to about 1 part by weight of catalyst per 100 parts by weight of amine.

Although a reaction diluent is usually not necessary in carrying out the above ethoxylation, an inert liquid diluent can be present in the reaction mixture, if desired, to aid in the dispersion of the alkylene oxide in the amine mixture. Examples of suitable diluents include monochlorobenzene, N,N-dimethylformamide, toluene, xylene, and the like.

The reaction product of ethylene oxide and the amine obtained, as described above, can be purified, if desired, but is preferably employed, without further treatment, in the second alkoxylation step. If purification of the ethylene oxide reaction product is desired before use of the product in the second alkoxylation, said purification can be effected using procedures known in the art. For example, the excess of ethylene oxide, if any is present, can be removed by entrainment in a stream of inert gas such as nitrogen, argon, xenon, and the like; if an inert organic solvent has been employed as reaction solvent, this can be removed by distillation under reduced pressure and the residue from such treatment or treatments can be purified by chromatography, counter-current distillation and the like.

The second alkoxylation step in which the ethoxylated product from the first stage above is reacted with a vicinal alkylene oxide containing at least 3 carbon atoms, is carried out advantageously at a temperature in the range of from about 100° C. to about 250° C., preferably from 105° C. to 110° C., at atmospheric or superatmospheric pressure in the presence of an alkoxylation catalyst. Lower reaction temperature could be employed with an increase in reaction times. Preferably the catalyst employed is the same as that employed in the first stage of the process of the invention, if that stage has been conducted in the presence of a catalyst. Where an alkoxylation catalyst has been employed in the ethoxylation stage of the process of the invention, the reaction product from the first stage can be employed, without further treatment, in the second stage and no further addition of catalyst is generally necessary.

When an alkoxylation catalyst is employed in the second alkoxylation stage of the process of the invention, said catalyst is employed in an amount within the range set forth above for the ethoxylation stage (first stage) of the process.

The amount of vicinal alkylene oxide employed in this second alkoxylation step is generally from 1 to 5.1 moles of alkylene oxide for each mole of diamine employed as starting material in the first step of the process of the invention.

When the vicinal alkylene oxide is unsymmetrical, i.e., the groups $R_1$ and $R_2$ are not identical, it will be seen from the following reaction schemes that the addition of the vicinal alkylene oxide across the O—H bond of a hydroxyethyl group in the reaction product from the first step of the reaction, can occur in the two possible ways giving rise to a mixture of products.

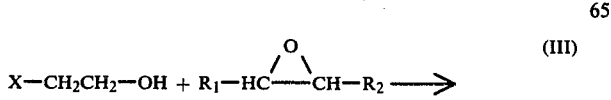
(III)

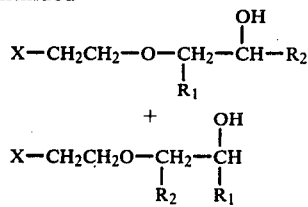

In the above equation, X represents the residue of the reaction product obtained in the first step of the process hereinbefore defined. The above equation typifies the reaction that will occur in respect of each of the plurality of hydroxyethyl substituents present in the reaction from the first step of the process of the invention. When the vicinal alkylene oxide is employed in an excess over that required to alkoxylate each of the hydroxyethyl groups in the starting material, further reaction of the alkylene oxide with the products shown in the above equation will occur with analogous results.

Where $R_2$ in the alkylene oxide (II) represents hydrogen, it will be seen that one of the possible reaction products shown in the above equation will contain a secondary hydroxyl group, while the other product will have a terminal primary hydroxy group. In general, it has been found that the reaction product having the secondary hydroxyl group is the predominate isomer although the product usually contains at least a minor amount, e.g., about 10 percent, of the primary hydroxy configuration.

The products obtained in the second alkoxylation stage of the invention can be isolated and purified, if desired, by known procedures. For example, any excess of vicinal alkylene oxide can be removed by purging the reaction mixture with an inert gas such as nitrogen, argon, xenon, and the like. If an inert organic solvent has been used as reaction solvent, this can be removed by distillation under reduced pressure. The sequentially alkoxylated product so obtained can be purified, or in the case of a mixture, can be separated into its individual components, if desired, by conventional purification and separation techniques such as chromatography, counter-current distribution, fractional distillation and the like, or any combination of these techniques.

The sequentially alkoxylated products of the invention can be represented by the following general formula:

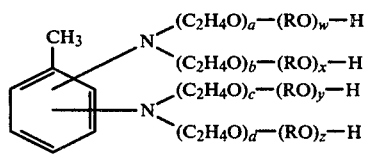

where R represents an alkylene group of from 3 to 9 carbon atoms,
  a, b, c, d, w, x, y and z represent numbers from 0 to 2,
  a+b+c+d is from 3 to 5,
  w+x+y+z is from 1 to 5.1, and wherein the relationship of a, b, c, d, w, x, y and z to each other satisfies the following:

$5 \leq a+b+c+d+w+x+y+z \leq 8.1$.

Put another way, the adduct of the invention is produced by sequentially reacting toluene diamine first with from 3 to 5 moles of ethylene oxide per mole of toluene diamine and second with from 1 to 5.1 moles per mole of starting diamine of a vicinal alkylene oxide having from 3 to 9 carbon atoms. The vicinal alkylene oxide is preferably propylene oxide. As hereinbefore noted, the total number of moles of ethylene oxide and vicinal alkylene oxide should be at least 5 and should not exceed 8.1. It has been found that these limits are essential to obtaining foams having an excellent balance of properties including low friability and good dimensional stability. For most purposes, it is preferred that the toluene diamine be reacted first with four moles of ethylene oxide and then with from 1 to 4.1 moles of vicinal alkylene oxide. The number of moles of vicinal alkylene oxide per mole of amine is more preferably from 2 to 4.1 and is most preferably from 2.5 to 3.5.

While the moles of vicinal alkylene oxide can be varied within the range of 1 to 5.1, the preferred ranges noted above yield certain advantageous properties when used to make a polyurethane foam. Thus, foams produced using polyols having vicinal alkylene oxide contents of from 1 to 4.1 moles exhibit excellent surface friability characteristics. However, if more than 3 moles are used, the resultant foam is not as dimensionally stable as a foam produced from an adduct containing from 1 to 3 moles of vicinal alkylene oxide. Similarly, if less than 3 moles are used, compatability of the adduct with any blowing agent present may become a problem.

In any event, it has been found that an excellent balance of properties can be obtained when using a polyol comprising from 10 to 100 percent by weight of the adduct, and from 0 to 90 percent by weight of a hydroxyl group containing material containing from 2 to 8 hydroxyl groups and preferably containing alkylene oxide [i.e., ─O─R─] residues, the amount of ethylene oxide residues in the polyol blend being less than 80 percent, preferably less than 70 percent and most preferably less than 60 percent, based on the total number of alkylene oxide residues in the blend. The amount of the hydroxyl group containing material will necessarily vary depending upon the moles of vicinal alkylene oxide used to produce the adduct, and the particular property desired. For example, relative to blowing agent compatibility lesser amounts of the hydroxyl group containing material will be needed as the vicinal alkylene oxide content in the adduct increases. Similarly, for purposes of dimensional stability, the amount of material needed will increase with increasing vicinal alkylene oxide content in the adduct.

The materials which can be used in combination with the adducts of the instant invention can be any of those commonly known and used in the polyurethane art. Essentially any polyol having from 2 to 8 hydroxyl groups can be used, including polyether polyols, polyester polyols, polythioether polyols and the like, which materials are generally known and used in the polyurethane art. It is generally preferred, however, to utilize polyethers which contain alkylene oxide residues. The only proviso relative to the polyether is that the total amount of ethylene oxide units present in the polyol blend is less than 80 percent of the total amount of alkylene oxide residues present in the blend. Specific useful materials include polyoxypropylene glycols, prepared in the addition of 1,2-propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and 1,2-propylene oxide; polyether glycols prepared by reacting ethylene oxide, propylene oxide or mixtures thereof with mono-and polynuclear dihydroxy benzenes, e.g., catechol, resorcinol, hydroquinone, orcinol, 2,2-bis(p-hydroxyphenyl) propane, bis (p-hydroxyphenyl) methane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g., methyl, ethyl, propyl, butyl, and 2-ethylhexyl, arabinoside, xyloside, fructoside, glucoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran and 3,3,5,5-tetrakis(hydroxymethyl)-4-hydroxytetrahydropyran; or polyols containing an aromatic nucleus such as 2,2-bis-(hydroxyphenyl) ethanol, pyrogallol, phloroglucinol, tris(hydroxyphenyl) alkanes, e.g., 1,1,3-tris(hydroxyphenyl)-ethanes, and 1,1,3-tris(hydroxyphenyl)propanes, etc. tetrakis(hydroxyphenyl) alkanes, e.g., 1,1,3-tris(hydroxyphenyl)-ethanes, and 1,1,3-tris(hydroxyphenyl)propanes, etc., tetrakis(hydroxyphenyl)alkanes, e.g., 1,1,3,3-tetrakis(-hydroxy-3-methylphenyl)propanes, 1,1,4,4-tetrakis(hydroxyphenyl)-butanes, and the like.

Illustrative of polyester polyols which can be employed in the invention are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol 1,2-propylene glycol, 1,4-butanediol, and cyclohexandeiol may also be used. In preparing rigid polyurethane foams, it is recommended that no more than about 20% of the hydroxyl groups of the polyester used by supplied by a diol. The above polyesters are typical of those which can be employed in the one-shot, but preferably in the prepolymer, methods of foaming.

The novel polyols of the invention are useful as intermediates in the preparation of polyurethanes in accordance with procedures known in the art and are distinguished from polyols hitherto prepared by their superior properties in relation to viscosity and compatibility in such use, and by the improved properties imparted to the resulting polyurethanes.

In preparing polyurethanes from the polyols of the invention, the procedures well-known in the art for the preparation of such materials are employed, the polyols of the invention being used to replace a part or the whole of the polyol components employed in the art procedures. While the polyols of the invention can be applied to the formation of any type of polyurethane, including cellular and non-cellular polyurethanes, they are of particular application in the preparation of cellular polyurethane products. Accordingly, the use of the polyols of the invention in the preparation of polyurethanes will be illustrated by reference to the preparation of cellular products, but it is to be understood that the invention is not limited thereto but is of general application to the preparation of polyurethanes of all types.

The various methods for the preparation of polyurethane foams are well known in the art and do not require detailed discussion; see, for example, Dombrow, "Polyurethanes," Reinhold Publishing Corporation, New York, pages 1–105 (1957); Saunders et al "Polyurethanes", Part I, Interscience Publishers, New York (1962). One of the commonest procedures consists in reacting a polyol, for example, a polyester or polyether, with an organic polyisocyanate and with a blowing agent, if necessary in the presence of catalysts, surface active agents or other auxiliary agents, whereby simultaneous interaction between the isocyanate, blowing agent and the polyol occurs to give the required foam product. This is the so-called "one-shot" procedure. Alternatively, the polyol may be reacted with sufficient polyisocyanate to give an intermediate reaction product containing free isocyanate groups and this product, known as prepolymer, may then be reacted with water, if desired in the presence of catalyst, surface active agents or other auxiliary agents, in order to produce the final foamed product. This latter is the so-called "prepolymer" process. Many variations in the method of carrying out these basic processes are known.

Any of the prior art polyisocyanates conventionally used in the preparation of rigid polyurethane foams can be employed in the process of the present invention. Illustrative of such isocyanates are 2,4-tolylene diisocyanate, 2,6-tolylene diisocyanate, 4,4'-diphenylmethane diisocyanate, dianisidine diisocyanate, tolidine diisocyanate, hexamethylene diisocyanate, m-xylylene diisocyanate, 1,5-napthalene diisocyanate, and other di- and higher polyisocyanates such as those listed in the tables of Siefken, Ann. 562, 122–135 (1949). Mixtures of two or more of the above isocyanates can be used if desired. Preferred polyisocyanates are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. Pat. Nos. 2,683,730; 2,950,263; and 3,012,008; Canadian Pat. No. 665,495; and German Pat. No. 1,131,877. A particularly preferred polyisocyanate of this type is the polymethylene polyphenyl isocyanate available commercially under the trademark Mondur MR.

In making rigid foams in accordance with the process of the invention it may be advantageous to add a hydroxyl terminated cross-linking polyol to the reaction mixture to form the best network for foam formation. Advantageously the cross-linking polyol should have at least 3 hydroxy groups in the molecule and can be added to the foam reaction mix at any point at which the other polyols are added. Examples of such cross-linking polyols include trimethylolpropane, glycerol, 1,2,6-hexanetriol, pentaerythritol, hydroxyalkylated aliphatic diamines such as N,N,N',N'-tetrakis(2-hydroxypropyl)ethylenediamine, N,N,N',N'-tetrakis(2-hydroxyethyl)ethylenediamine, and the like, and alkylene oxide reaction products of sugars such as sucrose, and the like.

In preparing polyurethane foams according to the invention, it is desirable, in accordance with conventional procedures, to employ a catalyst in the reaction of the polyisocyanate and polyol. Any of the catalysts conventionally employed in the art to catalyze the reaction of an isocyanate with reactive hydrogen containing compound can be employed for this purpose; see, for example, Saunders et al., Ibid, Volume I, pages 228–232; see, also Britain et al. "J. Applied Polymer Science," 4,207–4,211, 1960. Such catalysts include organic and inorganic acid salts of and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. The preferred catalysts for use in the process and compositions of the invention are the tertiary organic amines of which the following are representative: triethylamine, triethylenediamine, N,N,N',N'-tetramethylethylenediamine, N,N,N',N'-tetraethylethylene diamine, N-methylmorpholine, N-ethylmorpholine, N,N,N'N'-tetramethylguanidine, N,N,N',N'-tetramethyl-1,3-butanediamine, N,N-dimethylethanolamine, N,N-diethylethanolamine, and the like, or mixtures of two or more such amines. The amount of catalyst employed is generally within the range of about 0.1 to about 2.0% by weight based on total weight of reactants in the polyurethane forming reaction mixture.

The ratio of isocyanate groups to active hydrogen containing groups in the foam mixtures of the invention is within the normal limits employed in the production of polyurethane foams. This said ratio is advantageously within the range of from 1.50 to 0.65:1 and preferably within the range of 1.20:1 to 1:1, whether the isocyanate and polyol are employed separately in the one-shot process or whether the two components have been reacted to form a prepolymer.

The final foam density of the products produced by the process of the invention can be controlled in accordance with methods well known in the art. For example, this control can be accomplished by regulating the amount of water present in the foam mixture or by using a combination of water and a conventional blowing agent having a boiling point below about 110° C. and preferably below about 50° C., such as a volatile aliphatic hydrocarbon or a volatile highly halogenated hydrocarbon, for example, trichloromonofluoromethane, chlorotrifluoromethane, 1,1-dichloro-1-fluoroethane, 1-chloro-1,1-difluoro-2, 2-dichloroethane and 1,1,1-trifluoro-2-chloro-2-fluorobutane or mixtures thereof.

Optional additives such as dispersing agents, cell stabilizers, surfactants, flame retardants, and the like which are commonly employed in the fabrication of rigid polyurethane foams, can be employed in the process of the invention. Thus, a finer cell structure may be obtained if water-soluble organosilicone polymers are used as surfactants. Organosilicone polymers obtained by condensing a polyalkoxy polysilane with the monoether of a polyalkyleneether glycol in the presence of an acid catalyst are representative of those surfactants which can be used for this purpose. The organosilicone copolymer available under the trade name L5420 is typical of such polymers. Other surfactants such as ethylene oxide modified sorbitan monopalmitate or ethylene oxide modified polypropyleneether glycol may be used, if desired, to obtain better dispersion of the components of the foam mixture.

Other additives such as dyes, pigments, soaps and metallic powders and other inert fillers may be added to the foam mixture to obtain special foam properties in accordance with practices well-known in the art.

The polyurethane foams produced using the novel polyols of the instant invention are useful in a variety of commercial and industrial applications including for example, the production of foam-insulation, structural foam sporting goods, and the like.

The following examples are provided to illustrate the present invention. Unless otherwise specified, all parts are by weight.

EXAMPLES 1 THROUGH 3

In producing the adducts of these examples, the following procedure was followed:

The toluene diamine was charged to a pressure reactor and was heated to 105° C. under 6 to 8 psi nitrogen. The addition of the ethylene oxide was then begun. The addition was at a rate such as to keep the temperatures between 105° C. and 110° C. Cooling or heating was applied to maintain this temperature range. When all the ethylene oxide had been added, the reaction mixture was kept for two hours at 105° C. to 110° C.

Aqueous (50%) potassium hydroxide was added to the reactor in an amount equal to 0.5 percent by weight of the total batch feed. The water was distilled off at 110° C.

The addition of the propylene oxide was then started at a rate such as to maintain the temperature between 105° C. to 110° C. at a pressure of 6 to 8 psi nitrogen. After the addition was complete, the mixture was maintained at 105° C. to 110° C. for three hours.

The finished product was neutralized with sulfuric acid and the resultant potassium sulfate was filtered off, leaving the product.

The amounts of materials used, together with the moles of combined alkylene oxide and hydroxyl number of the product are indicated in Table 1.

TABLE 1

| Example | 1 | 2 | 3 |
|---|---|---|---|
| Toluene Diamine gms | 25.5 | 22.8 | 34.3 |
| Ethylene Oxide gms | 33.2 | 32.8 | 49.4 |
| Propylene Oxide gms | 41.2 | 44.4 | 16.3 |
| Product: | | | |
| Moles TDA/EO/PO | 1/3.6/3.39 | 1/4/4.1 | 1/4/1 |
| Hydroxyl Number | 470 | 418 | 630 |

EXAMPLE 4

Toluene diamine (47.7 parts) and 68.9 parts of ethylene oxide were charged to a pressure reactor and reacted for two days at 50° C. The reaction mixture was then cooled to room temperature and charged with 45.4 parts of propylene oxide and reacted for two days at 80° C. The resultant adduct had an OH number of 540 and a molar ratio of components of TDA/ethylene oxide/propylene oxide of 1/4/2.

EXAMPLES 5 THROUGH 20

The adducts of Examples 1 through 4 were used to produce foams. The foams in each of these examples were prepared by hand mixing. They were prepared under ambient conditions according to the formulations shown in Table 2 (all parts being parts by weight).

Mixing was accomplished by a high speed air driven mixer equipped with a single three-winged blade. The adduct, polyol (when used), surfactant, catalyst, combustibility modifier (when used), blowing agent, and water (when used) were pre-blended in a cylindrical cardboard container. The indicated quantity of isocyanate was added and mixed intimately with the above blend. The mixed liquid was then poured into a 13"×13"×6" box and the foam allowed to rise freely. The reaction times were recorded on the foaming material and surface friability was determined thirty minutes after the initial foaming reaction. The results were as indicated in Table 3. Additionally, in some instances, the various physical properties noted in Table 3 were recorded.

In Table 3, the following terms appear and are defined as follows:

(1) Mix time: the duration of mixing after the isocyanate is added to the resin blend.
(2) Cream time: the elapsed time from the start of mix time until the time at which a change in color of the mixed liquid from brown to creamy tan is noted.
(3) Gel time: the elapsed time from the start of mix time until the time at which a ⅛" diameter applicator stick inserted 2" into the rising foams, pulls with it a 6" long "string" when it is quickly removed from the foam.
(4) Tack free time: the elapsed time from the start of mix time until the time at which a clean dry tongue depressor lightly touched to the foam surface can be removed without pulling off the foam surface.
(5) Rise time: the elapsed time from the start of mix time until the time at which no additional visible foam rise can be observed.
(6) Surface friability: the characteristic of a foam surface to powder when slightly compressed or lightly scraped with a tongue depressor or fingernail. This characteristic is usually fleeting.
(7) Non-friable (NF): a foam surface which up to 30 minutes after foam mixing shows no friability.
(8) Very-slightly friable (VSF): a foam surface which up to 30 minutes after foam mixing shows no more than 1/32" of powdering when scraped.
(9) Slightly friable (SF): a foam surface which up to 30 minutes after foam mixing shows no more than 1/16" of powdering when scraped.
(10) Friable (F): a foam surface which up to 30 minutes after foam mixing shows no more than ⅛" of powdering when scraped.
(11) Very friable (VF): a foam surface which up to 30 minutes after foam mixing shows more than ⅛" of powdering when scraped.

TABLE 2

| Ingredient | Example Number | | | | | | | | | | | | | | | |
|---|---|---|---|---|---|---|---|---|---|---|---|---|---|---|---|---|
| | 5 | 6 | 7 | 8 | 9 | 10 | 11 | 12 | 13 | 14 | 15 | 16 | 17 | 18 | 19 | 20 |
| Adduct of Example 1 | 100 | 90 | 80 | 70 | 80 | 70 | 70 | — | — | — | — | — | — | — | — | — |
| Adduct of Example 2 | — | — | — | — | — | — | — | 100 | 90 | 70 | 70 | 70 | — | — | — | — |
| Adduct of Example 3 | — | — | — | — | — | — | — | — | — | — | — | — | 20 | 20 | 20 | — |

TABLE 2-continued

| Ingredient | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|
| Adduct of Exmaple 4 | — | — | — | — | — | — | — | — | — | — | — | — | — | — | — | 20 |
| R8020[1] | 1.0 | 1.0 | 1.0 | 1.0 | 1.0 | 1.0 | 1.0 | 1.5 | 1.5 | 1.5 | 1.5 | 1.5 | 1.0 | 1.0 | 1.0 | 1.0 |
| DC193[2] | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| R11B[3] | 30 | 30 | 30 | 30 | 30 | 30 | 30 | 30 | 30 | 30 | 30 | 30 | 30 | 30 | 30 | 30 |
| Fyrol 6[4] | — | 10 | 10 | 10 | 10 | 10 | 10 | — | 10 | 10 | 10 | 10 | 10 | 10 | 10 | 10 |
| $H_2O$ | — | 0.5 | 0.5 | 0.5 | 0.5 | 0.5 | 0.5 | — | 0.5 | 0.5 | 0.5 | 0.5 | 0.5 | 0.5 | 0.5 | 0.5 |
| Polyol A[5] | — | — | 10 | 20 | — | — | — | — | — | — | 20 | — | — | — | — | — |
| Polyol B[6] | — | — | — | — | 10 | 20 | — | — | — | 20 | — | — | — | — | — | — |
| Polyol C[7] | — | — | — | — | — | — | 20 | — | — | — | — | 20 | — | 70 | — | — |
| Polyol D[8] | — | — | — | — | — | — | — | — | — | — | — | — | 70 | — | — | 70 |
| Polyol E[9] | — | — | — | — | — | — | — | — | — | — | — | — | — | — | 70 | — |
| Isocyanate[10] | 120 | 128 | 132 | 136 | 128 | 129 | 127 | 103 | 112 | 116 | 123 | 114 | 117 | 131 | 126 | 112 |

[1]R-8020 is a blend of 80 percent by weight of dimethyl ethanolamine and 20 percent by weight of triethylenediamine.
[2]DC193 is a commercial silicone surfactant available from Dow-Corning Corporation.
[3]R11B is Freon blowing agent.
[4]Fryol 6 is O,O-diethyl-N,N-bis(2-hydroxyethyl)aminomethyl phosphonate.
[5]Polyol A is an ethylene diamine initiated polyether polyol having an OH number of 630.
[6]Polyol B is an ethylene diamine initiated polyether polyol having an OH number of 470.
[7]Polyol C is a sucrose polyether polyol of 460 OH number.
[8]Polyol D is a sucrose polyether polyol of 380 OH number.
[9]Polyol E is a methylene-dianiline initiated polyether polyol having an OH number of 410.
[10]The isocyanate used was a polyphenylpolymethylene polyisocyanate containing about 50 percent by weight of diphenylmethane diisocyanate and having anisocyanate content of about 32 percent.

TABLE 3

| Property | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|
| Reaction Times (Secs) | | | | | | | | | | | | | | | | |
| Mix | 10 | 10 | 10 | 10 | 10 | 10 | 10 | — | — | — | — | — | — | — | — | 15 |
| Cream | 25 | 31 | 20 | 18 | 21 | 18 | 29 | 25 | 21 | 14 | 15 | 26 | 35 | 35 | 25 | 36 |
| Gel | 80 | 96 | 67 | 54 | 72 | 59 | 122 | 67 | 74 | 49 | 52 | 92 | 110 | 175 | 110 | 135 |
| Tack-Free | 123 | 168 | 95 | 67 | 102 | 77 | 226 | 95 | 118 | 75 | 68 | 156 | 180 | 290 | 155 | 234 |
| Rise | 160 | 215 | 150 | 120 | 145 | 130 | 265 | 135 | 160 | 100 | 100 | 200 | 220 | 325 | 220 | 305 |
| Surface Friability | NF | F* | VSF | NF | NF | NF | F* | NF | NF | NF | NF | NF | NF | NF | NF | NF |
| Density (pcf) ASTM 1622-70 | 2.05 | 1.84 | 1.90 | 1.94 | 1.85 | 1.83 | 1.85 | 2.00 | 1.91 | 1.69 | 1.80 | 1.93 | 1.90 | 2.00 | — | 2.02 |
| % Closed Cells ASTM D2856-70 | 90.8 | 89.9 | 90.7 | 90.7 | 90.7 | 90.6 | 89.5 | 92.0 | 91.9 | 89.9 | 92.1 | 91.8 | 89.1 | 23.5 | 90.4 | 88.8 |
| Compressive Strength ASTM D-1621-64 | | | | | | | | | | | | | | | | |
| (1) Parallel @ Yield (psi) | 49.6 | 42.0 | 48.1 | 52.0 | 45.6 | 43.3 | 39.1 | 46.0 | 33.0 | 31.8 | 40.0 | 37.3 | 34.5 | 28.8 | — | 37.3 |
| (2) Perpendicular @ Yield (psi) | 14.6 | 11.8 | 12.5 | 13.3 | 11.3 | 11.1 | 11.0 | 16.8 | 14.5 | 9.8 | 14.3 | 14.8 | 13.3 | 16.3 | — | 18.5 |
| Dimensional Stability ASTM D-2126-71 | | | | | | | | | | | | | | | | |
| % Vol −30° C. 1 Day | +.39 | +.06 | +.46 | +.30 | +.46 | +.13 | −.12 | — | — | — | — | −1.1 | — | — | +0.4 | |
| % Vol −30° C. 7 Days | −.33 | +.26 | +.39 | +.59 | +.13 | +.27 | −.31 | — | — | — | — | — | 0 | — | — | +0.5 |
| % Vol −30° C. 14 Days | −.26 | 0 | +1.76 | +1.98 | +1.56 | +1.46 | −.44 | — | — | — | — | — | −1.3 | — | — | +0.5 |
| % Vol 70° C./100% RH 1 Day | 5.63 | 5.67 | 4.11 | 3.00 | 6.42 | 4.12 | 7.13 | 14.1 | 13.1 | 19.7 | 7.1 | 8.9 | 10.3 | — | — | 10.2 |
| % Vol 70° C./100% RH 7 Days | 7.40 | 7.53 | 4.38 | 3.77 | 7.74 | 5.92 | 7.75 | 20.1 | 24.9 | 22.0 | 9.5 | 16.9 | 11.9 | — | — | 24.7 |
| % Vol 70° C./100% RH 14 Days | 11.20 | 10.11 | 8.76 | 6.59 | 12.69 | 10.98 | 11.81 | 26.9 | 32.7 | 33.5 | 11.4 | 22.18 | 12.8 | — | — | 30.9 |
| % Vol. 100° C. Ambient Humidity 1 Day | 2.05 | 1.08 | 1.19 | 0.95 | 1.37 | 1.10 | 1.33 | 8.9 | 6.1 | 4.6 | 2.1 | 3.0 | 1.1 | — | — | 2.1 |
| % Vol 100° C. Ambient Humidity 7 Days | 4.04 | 2.66 | 3.24 | 3.05 | 3.46 | 3.86 | 4.00 | 10.8 | 10.7 | 14.3 | 4.3 | 8.5 | 5.0 | — | — | — |
| % Vol 100° C. Ambient Humidity 14 Days | 8.94 | 5.22 | 4.56 | 3.44 | 9.30 | 10.09 | 7.19 | — | — | — | — | — | 6.0 | — | — | 3.6 |

*The friability was induced by fire retardant and/or Polyol C.

What is claimed is:

1. A polyol comprising the adduct obtained by sequentially reacting toluene diamine with from 3 to 5 moles of ethylene oxide and then with from 1 to 5.1 moles of a vicinal alkylene oxide of from 3 to 9 carbon atoms, the total number of moles of ethylene oxide plus vicinal alkylene oxide being at least five and no more than 8.1.

2. The polyol of claim 1 wherein said adduct is obtained by sequentially reacting toluene diamine with four moles of ethylene oxide and then with from 1 to 4.1 moles of said vicinal alkylene oxide.

3. The polyol of claim 2 wherein said vicinal alkylene oxide is propylene oxide.

4. A polyol comprising:
(a) from 10 to 100 percent by weight of an adduct obtained by sequentially reacting toluene diamine with from 3 to 5 moles of ethylene oxide and then with from 1 to 5.1 moles of a vicinal alkylene oxide of from 3 to 9 carbon atoms, the total number of moles of ethylene oxide plus vicinal alkylene oxide being at least five and no more than 8.1,
(b) from 0 to 90 percent by weight of an organic material containing from 2 to 8 hydroxyl groups.

5. The polyol of claim 4 wherein said adduct is obtained by sequentially reacting toluene diamine with four moles of ethylene oxide and then with from 1 to 4.1 moles of said vicinal alkylene oxide.

6. The polyol of claim 4 wherein said organic material contains alkylene oxide residues, the amount of ethylene oxide residue in the polyol being less than 80 percent based on the total number of alkylene oxide segments in said polyol.

7. The polyol of claim 6 wherein said vicinal alkylene oxide is propylene oxide.

8. A polyol of the structural formula:

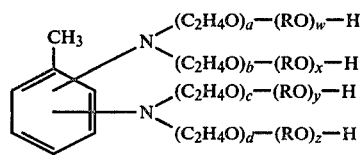

where R represents an alkylene group of from 3 to 9 carbon atoms,
a, b, c, d, w, x, y and z represent numbers from 0 to 2,
$a+b+c+d$ is from 3 to 5,
$w+x+y+z$ is from 1 to 5.1, and wherein the relationship of a, b, c, d, w, x, y and z to each other satisfies the following:

$$5 \leq a+b+c+d+w+x+y+z \leq 8.1.$$

9. The polyol of claim 8 wherein $a+b+c+d$ is 4, and $w+x+y+z$ is from 1 to 4.1.

10. The polyol of claim 9, wherein R represents a propylene group.

* * * * *